Oct. 30, 1951    G. S. BUTENKOFF    2,573,398
TORSIONAL VIBRATION DAMPENER
Filed May 12, 1947

Inventor
George S. Butenkoff
By Richard y Geier
Attorneys

Patented Oct. 30, 1951

2,573,398

UNITED STATES PATENT OFFICE 2,573,398

TORSIONAL VIBRATION DAMPENER

George S. Butenkoff, Westwood, N. J.

Application May 12, 1947, Serial No. 747,403

3 Claims. (Cl. 74—574)

This invention refers to a combined fan driving pulley and torsional vibration dampener for attachment to the crank shaft of power units especially those of the internal combustion type.

Great care is exercised in the manufacture of crank shafts for internal combustion engines in order that a unit of high efficiency capable of withstanding rough usage over long periods of time may be provided. However, it has been found that in actual service torsion constituting alternate twisting and untwisting of the rod will arise, and, if permitted to go unchecked may result in failure of a vital member. The use of torsional vibration dampeners of the type described in my Patent No. 1,758,274, issued May 13, 1930, with power units of automotive equipment has been restricted due in some measure to space limitations.

It is an object of the present invention to provide a torsional vibration dampener that may be used also as the fan belt driving wheel usually found in power units of this type.

A further object is to provide a torsional vibration dampener of such simple design and construction that the initial cost will be comparatively low and maintenance negligible.

Other objects will become apparent in the course of the following specifications.

In the attainment of these objectives, the fan belt driving wheel usually keyed to the crankshaft of an internal combustion engine has been redesigned to perform the dual functions of driving the fan as well as reducing torsional vibration in the shaft.

As a driver for the fan, the subject of this invention performs the usual functions of such devices. As a vibration dampener, in the other hand, the undesirable torsional vibrations of the shaft are reduced or even nullified by being opposed by vibration set up within the dampener.

This invention will appear more clearly from the following detailed description when taken in conjunction with the accompanying drawing, showing by way of example a preferred embodiment of the invention.

Figure 3:
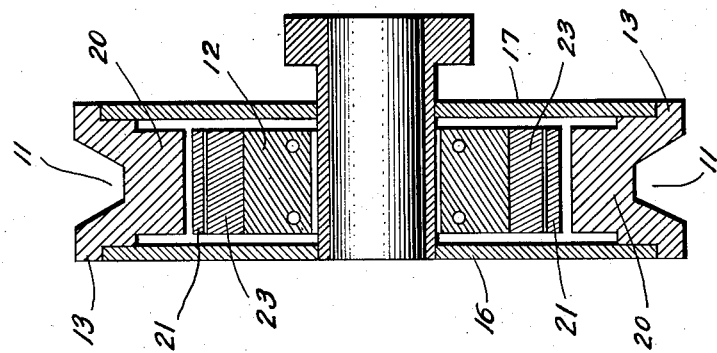
Figure 3 is a sectional view along the line 3—3 of the device shown in Figure 1 with crank shaft omitted.

Referring now in greater detail to the drawings in which like reference numerals indicate like parts, reference numeral 10 indicates the crank shaft 11, the groove of the pulley formed as the rim of the torsional vibration dampener, and 12 the flat springs which transmit the torsional vibration of the shaft to the interior of the dampener.

Figure 2:
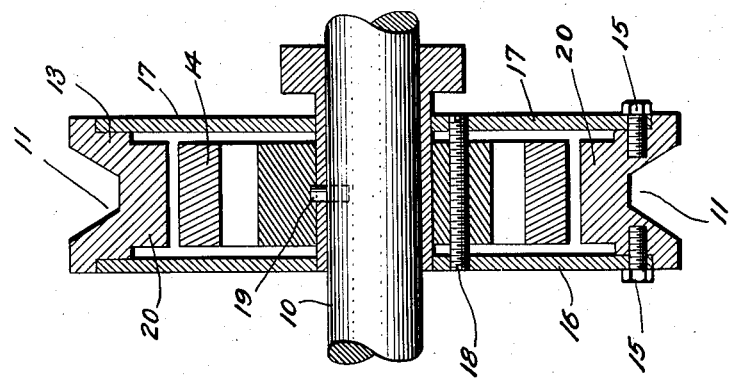
Figure 2 is a sectional view along the line 2—2 of the device shown in Figure 1 keyed to a fragmentary portion of the crank shaft.

The body of the combined torsional vibration dampener is formed of the rim portion 13 (Fig. 2) and the hub portion 14 held together by bolts 15 secured through side plates 16 and 17 around the rim and screws 18 around the hub. The body is adapted to be screwed on the shaft as shown in Figure 2 and keyed to rotate therewith by the key 19.

Figure 1:
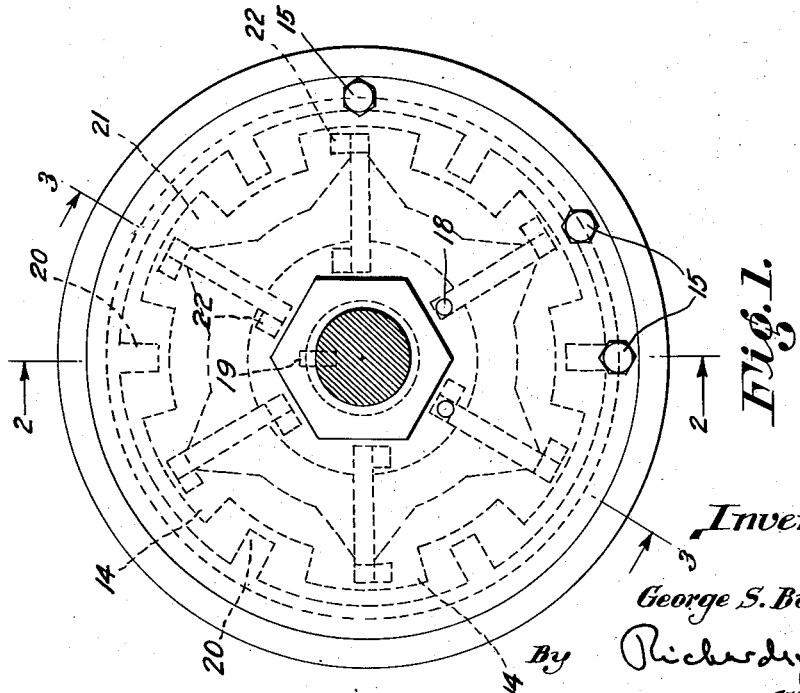
Figure 1 is a front view of the combined fan driving pulley and torsional vibration dampener.

Fins 20 are attached to the rim portion 13 of the body and fins 21 to the hub portion 14. The ends of the flat spring members 12 are attached near the hub as shown in Figures 1 and 3 by any suitable means. The opposite ends of the springs are disposed free to vibrate in the recesses 22 formed in the fins 21. Weighted members 23 may be disposed at the free ends of the vibrating springs 12 if desired. The space formed by the fins on the inside of the hollow dampener including the space between the vibrating end of the spring and recess is then filled with a viscous liquid such as oil to a level where the vibrating spring ends will be reasonably covered with the wheel rotating.

In operation, the force of the torsional vibration or internal moment of restitution of the shaft is transmitted to the spring members 12 through the wheel hub portion 14. The vibration of the spring members 12 causes the viscous oil to be forced in and out of the recesses 22 against the surface portions of the fins developing a countertorsional vibration in the device which will modify or even nullify by careful designing the source of its own vibration.

It is apparent that the specific illustration shown has been given by way of illustration and not by way of limitation and that the structure above described is subject to wide variation and modification without departing from the scope or intent of the invention, all of which variations and modifications are to be included within the scope of the present invention.

What is claimed is:

1. A torsional vibration dampener adapted for use with a driving shaft comprising a hub, means attaching the hub to the driving shaft and adapted to rotate the same therewith, a rim concentric with the hub and spaced therefrom, a plurality of fins disposed on the bottom surface portion of the rim, means securing the rim to the hub and adapted to leave a substantially liquid tight chamber therebetween, a plurality of spring members, one end of the spring members being secured in the hub rim with the free ends extending radially between the fins, a weight member disposed on the free end of each spring member, and a viscous liquid disposed in the liquid tight chamber.

2. A torsional vibration dampener in combination with a driving shaft, the dampener comprising a hub, means securing the hub to the driving shaft and adapted to rotate the same therewith, an outer rim concentric with the hub and spaced therefrom, a plurality of fins disposed on the bottom surface portion of the outer rim, a plurality of spring members disposed in the top surface portion of the hub rim and adapted to extend radially therefrom with the free ends between the fins, a weight member disposed on the free end of each spring member, a side plate disposed on either side of the rim and hub and adapted to form a housing for the spring members, and a viscous liquid disposed in the housing.

3. A torsional vibration dampener adapted to be used with the driving shaft of an internal combustion engine, said dampener comprising a hub, means securing the hub to the driving shaft and adapted to rotate the same therewith, an outer rim concentric with the hub and spaced therefrom, the hub and outer rim having substantially the same width, side plates disposed on either side of the outer rim and hub and adapted to form a substantially liquid tight compartment between the top surface portion of the hub rim and the bottom surface portion of the outer rim, a plurality of fins disposed in spaced relationship on at least the bottom surface portion of the outer rim, a plurality of spring members disposed in the compartment, one end of the spring members being attached to the top surface portion of the hub rim with the free ends thereof extending radially between the fins, at least one weight disposed substantially at the free end of each spring member, and oil disposed in the compartment.

GEORGE S. BUTENKOFF.

REFERENCES CITED

The following references are of record in the file of this patent:

UNITED STATES PATENTS

| Number | Name | Date |
| --- | --- | --- |
| 1,751,110 | Sparling | Mar. 18, 1930 |
| 1,906,925 | Edwards | May 2, 1933 |
| 1,950,886 | Gunn | Mar. 13, 1934 |
| 2,159,235 | Tyler et al. | May 23, 1939 |
| 2,253,591 | Travin et al. | Aug. 26, 1941 |